US011611476B2

(12) United States Patent
Patterson et al.

(10) Patent No.: US 11,611,476 B2
(45) Date of Patent: *Mar. 21, 2023

(54) ASSIGNMENT OF NETWORK CONFIGURATION FOR A WIRED NETWORK USING A WIRELESS NETWORK

(71) Applicant: NetApp, inc., Sunnyvale, CA (US)

(72) Inventors: John Allen Patterson, Niwot, CO (US); Derek J. Leslie, Erie, CO (US); Adam Carter, Louisville, CO (US); Marc Wayne Brotherson, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/330,648

(22) Filed: May 26, 2021

(65) Prior Publication Data

US 2021/0281478 A1     Sep. 9, 2021

Related U.S. Application Data

(63) Continuation of application No. 16/530,370, filed on Aug. 2, 2019, now Pat. No. 11,032,143.

(Continued)

(51) Int. Cl.
*H04L 41/0816* (2022.01)
*H04L 41/12* (2022.01)
(Continued)

(52) U.S. Cl.
CPC ...... *H04L 41/0816* (2013.01); *H04L 12/4645* (2013.01); *H04L 41/0893* (2013.01); *H04L 41/12* (2013.01)

(58) Field of Classification Search
CPC ............. H04L 12/4645; H04L 41/0816; H04L 41/0893; H04L 41/12; H04L 12/2807; H04L 2012/2841
See application file for complete search history.

(56) References Cited

U.S. PATENT DOCUMENTS 8,958,402 B2    2/2015  Ota et al.
9,225,551 B2   12/2015  Fouren et al.
(Continued)

FOREIGN PATENT DOCUMENTS

EP        2701447 A1    2/2014
JP     2006254301 A    9/2006
(Continued)

OTHER PUBLICATIONS

International Search Report and the Written Opinion for Application No. PCT/US2019/044830, dated Oct. 18, 2019, 14 pages.

*Primary Examiner* — Jason D Recek
(74) *Attorney, Agent, or Firm* — Jaffery Watson Mendonsa & Hamilton LLP

(57) ABSTRACT

A technique is configured to utilize messages (e.g., frames) generated by a first layer of a protocol stack for a wireless network to configure network parameters associated with a second layer of the protocol stack for a wired network. The messages are illustratively beacon frames generated by a data link layer of a Transmission Control Protocol/Internet Protocol (TCP/IP) stack for a wireless network, and the network parameters are illustratively IP addresses associated with a network layer of the TCP/IP stack for a wired network. Notably, the beacon frames of the wireless network may be utilized for two-way communication exchange on a per node basis for each node in the wired network.

20 Claims, 5 Drawing Sheets

Related U.S. Application Data

(60) Provisional application No. 62/714,278, filed on Aug. 3, 2018.

(51) Int. Cl.
*H04L 12/46* (2006.01)
*H04L 41/0893* (2022.01)

(56) References Cited

U.S. PATENT DOCUMENTS

| | | |
|---|---|---|
| 9,338,130 B2 | 5/2016 | Von Huben et al. |
| 9,743,450 B2 | 8/2017 | Pallen et al. |
| 2004/0064591 A1 | 4/2004 | Noble |
| 2004/0133687 A1 | 7/2004 | Yamaguchi et al. |
| 2004/0253969 A1 | 12/2004 | Nguyen et al. |
| 2008/0220741 A1 | 9/2008 | Hung |
| 2009/0088183 A1 | 4/2009 | Piersol et al. |
| 2009/0109946 A1 | 4/2009 | Morton et al. |
| 2012/0236769 A1 | 9/2012 | Powell et al. |
| 2013/0051314 A1 | 2/2013 | Ong et al. |
| 2013/0272224 A1 | 10/2013 | Ogawara |
| 2014/0366105 A1 | 12/2014 | Bradley et al. |
| 2015/0195668 A1 | 7/2015 | Kuo et al. |
| 2017/0126491 A1 | 5/2017 | Oedlund |
| 2018/0041994 A1* | 2/2018 | Zhang ............... H04W 12/06 |

FOREIGN PATENT DOCUMENTS

| | | |
|---|---|---|
| TW | I331464 B | 10/2010 |
| WO | 2013089438 A1 | 6/2013 |

\* cited by examiner

ASSIGNMENT OF NETWORK CONFIGURATION FOR A WIRED NETWORK USING A WIRELESS NETWORK

CROSS-REFERENCE TO RELATED APPLICATIONS

This application is a continuation of U.S. patent application Ser. No. 16/530,370, filed on Aug. 2, 2019, which claims the benefit of U.S. Provisional Application No. 62/714,278, filed on Aug. 3, 2018, both of which are hereby incorporated in their entirety for all purposes.

BACKGROUND

Technical Field

The disclosure generally relates to storage and compute nodes of a cluster, and more specifically, to network configuration of the storage and computer nodes of the cluster.

Background Information

A plurality of storage and compute nodes may be organized as a cluster to provide a distributed storage architecture configured to service storage requests issued by one or more clients of the cluster. The compute nodes include hardware resources, such processors, memory and networking, to provide compute services in a deployment of the cluster, while the storage nodes include such hardware resources, along with storage, to provide data storage and management services in the cluster. To that end, the storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices.

Configuring the storage and compute nodes as the cluster, e.g., a wired computer network, may be complicated. A typical wired network can have many nodes composed of multiple local area networks (LANs), any one of which can cause problems if not configured properly. Often, the networks are configured manually, for example, by entering commands at a console at a customer's site, e.g., a data center. Such a process can be cumbersome and error-prone. A misconfigured node can cause performance degradation for the node and for the networked system as a whole or a lack of connectivity entirely. Additionally, it can be difficult to pinpoint the cause of the problem in a network having many nodes, because of the complicated interaction of network traffic.

In some situations, the nodes are shipped to the customer's data center for "in-field" deployment where network configuration may be imposed by a system administrator of the customer. Such deployment may also encounter numerous difficulties with respect to installation and support of the nodes. For example, a data center may have tens, hundreds or even thousands of nodes that require correct network configuration parameters in order to operate properly and efficiently. Examples of such configuration parameters include the Internet Protocol (IP) address and virtual local area network (VLAN) tags for the node. While these parameters may be pre-configured using default values or even self-configured, correct deployment in a customer network is typically not possible for a system administrator until all network components have been installed and are operating correctly. Accordingly, there is a need for network configuration of the nodes in the cluster by means other than via the network for which the nodes are being configured.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
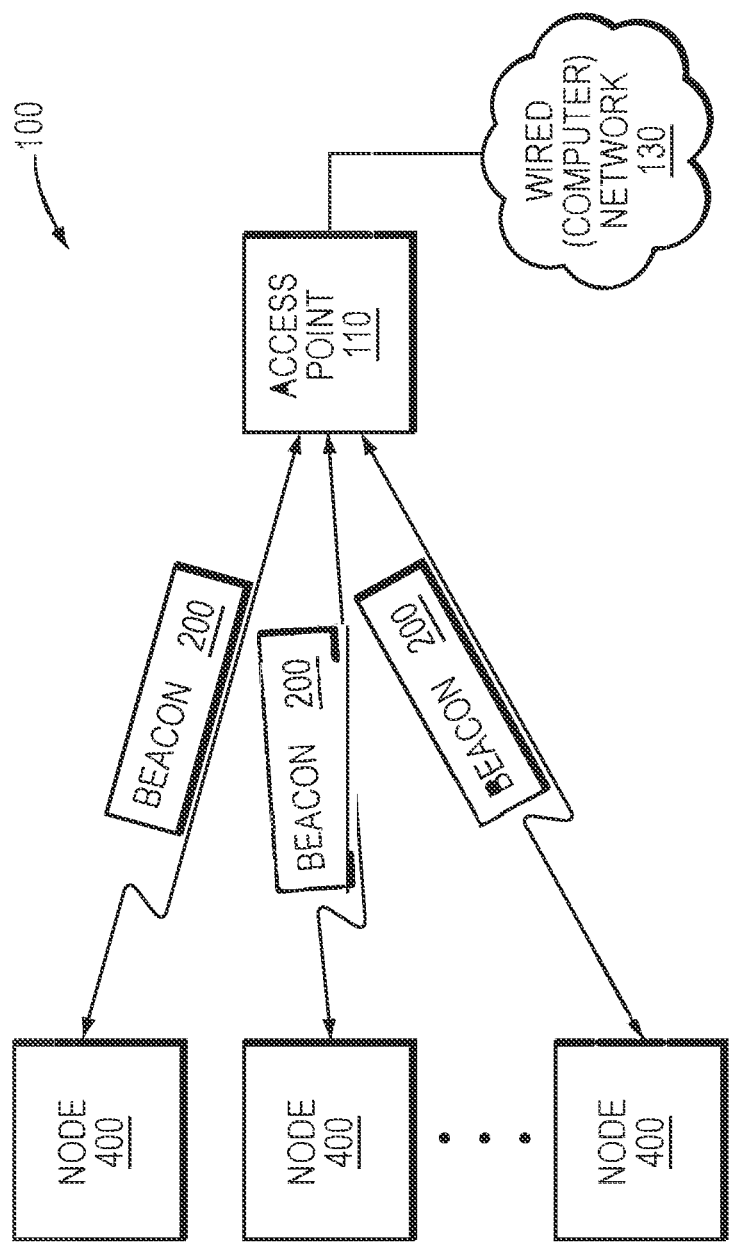
FIG. 1 is a block diagram of a plurality of nodes communicating with an access point over a wireless network.

The embodiments described herein are directed to a technique configured to utilize frames generated by a (first) layer of a protocol stack for a first network (i.e., acting as a configuration plane for cluster deployment) to configure network parameters for nodes of a cluster associated with another (second) layer of the protocol stack for a second network acting as an operating network (e.g., a high performance wired network) for the cluster. That is, the configuration plane is used to configure/deploy (i.e., initialize network parameters of) the nodes of the cluster to communicate on the operating network (i.e., deploy the nodes of the cluster) without the need to use the operating network for configuration. Illustratively, each node of the cluster may be configured with a wireless network interface (first network) and one or more wired interfaces (second network for cluster operation). The frames are illustratively wireless protocol beacon frames (e.g., IEEE 802.11 standard) generated by a data link layer of a Transmission Control Protocol/Internet Protocol (TCP/IP) stack for a wireless network (first network), and the network parameters are illustratively IP addresses associated with a network layer of the TCP/IP stack for the wired network (second network). Notably, the beacon frames of the wireless network may be utilized for two-way communication exchange on a per node basis for each node in the wired network.

According to an aspect of the technique, the beacon frames of the wireless network may be encoded to communicate assigned network configuration parameters to the nodes for use in the wired network, which is separate and apart from the wireless network. Each node may advertise an identifier, such as a serial number of the node and/or a Media Access Control (MAC) address, encoded in a service set identifier (SSID) of a beacon frame to an access point (AP) of the wireless network. The AP may examine the identifier and, in response, inform the node of its assigned network configuration by returning the beacon frame with configuration parameters (e.g., IP address and VLAN tag) encoded in the SSID of another beacon frame issued by the AP. In this manner, each node and the AP exchange beacon frames as a form of two-way communication using the SSID field of the beacon frame as a communication payload.

In another aspect of the technique, the information of the encoded beacon frames may be obtained from information transmitted over the wired network, such as the assigned IP addresses of one or more wired network interfaces of the nodes, and broadcast to an administrative node for configuration verification, discovery and/or reconfiguration purposes. The SSID of the wireless network interface may be encoded with the assigned IP address of the wired network interface, thereby providing an efficient and convenient way for the administrator to determine, verify and possibly change the network configuration parameters assigned to the wired network interface of the node. Illustratively the wireless network interface may be a Wi-Fi adapter coupled to the node via a Universal Serial Bus (USB) port (Wi-Fi dongle) such that the Wi-Fi dongle can be removed from the node by the administrator once the IP address has been determined. In response to a failure or error related to a wired network interface of a node (e.g., no IP address assigned), a visual indicator (e.g., a light emitting diode or similar mechanism) may be programmed according to a particular visual pattern (e.g., three long blinks followed by two short blinks) for diagnostic purposes, so that the node can be located. Accordingly, the SSID may be programmed with an error code associated with the failure and a corresponding pattern (e.g., "3L2S" for 3 long, 2 short). In this manner, a particular node with a reported error may be specifically identified and located.

Advantageously, the encoded content of the SSID in the beacon frame transmitted by the AP may be highly dynamic in that the content may change as the AP rotates communication among various nodes of the wired network. Note that multiple SSIDs may be broadcast simultaneously to support concurrent communication of more than one node with the AP. Initially, the SSID content may be encoded to instruct each node as to the network configuration parameters it should impose and utilize on the wired network. That is, the AP may return network configuration parameters to a node that advertises its serial number (via the SSID of the beacon frame), instructing the node to configure itself according to the parameters, such as IP address and VLAN tag, encoded in the SSID field. Note that SSIDs are typically limited to a predefined number (e.g., 32 for IEEE 802.11 standard) of characters, which can be used to advertise a variety of information such as serial number, as well as IP address (IPv4, IPv6) and VLAN tag. The two-way communication can be effected between each node and the AP and, once initially configured, between those nodes (of the wired network) and the administrative node for discovery and/or reconfiguration purposes. The administrative node (as well as the AP) may create and use a database of serial numbers and assigned network configuration (IP address, VLAN tag) of nodes in the wired network for management configuration purposes.

DESCRIPTION

Wireless Network

FIG. 1 is a block diagram of a plurality of nodes 400 for a cluster, such as storage and compute node, interconnected with an access point (AP) 110 over a wireless network 100. The nodes 400 may include functional components that cooperate to provide a distributed, scale-out storage architecture for a wired computer network 130, as described further herein. In an embodiment, the compute nodes may be physically and logically different from the storage nodes. For example, the compute nodes may illustratively include hardware resources, such processors, memory and networking, that cooperate to provide compute services for the wired network 130 (an operational data network for the cluster), while the storage nodes may include those hardware resources as well as storage that cooperate to provide data management and storage services for the network 130. Beacon frames 200 may be used by the AP 110 to wirelessly (e.g., via radio transmission) communicate network configuration information of the wired network 130 among the nodes 400. The beacon frames may be periodically transmitted over the wireless network 100 at a predetermined time, e.g., a target beacon transmission time (TBTT).

Figure 2:
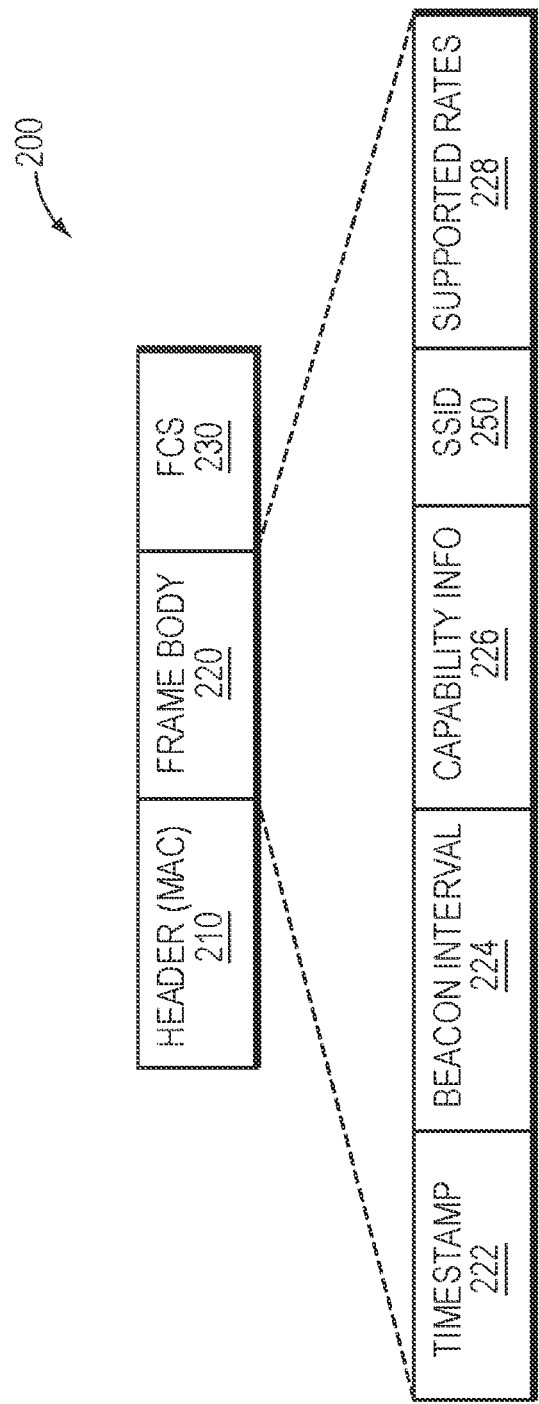
FIG. 2 is a block diagram illustrating an exemplary format of a beacon frame used for communicating over the wireless network.

FIG. 2 is a block diagram illustrating an exemplary format of a beacon frame 200 used for communicating over the wireless network 100, according to e.g., IEEE 802.11 standard. The beacon frame includes a media access control (MAC) header 210, frame body 220 and a frame check sequence (FCS) 230. The MAC header 210 contains, among others, destination and source MAC addresses, whereas the FCS 230 contains a cyclic redundancy check that allows detection of a corrupted transmitted frame. The frame body 220 includes fields having a timestamp 222, beacon interval 224, capability information 226, a service set identifier (SSID) 250 and supported rates 228. The timestamp 222 is a value (e.g., in microseconds) representing the time on the AP 110, i.e., the time that the AP has been active, and the beacon interval 224 represents the number of time units between TBTTs. The capability information 226 contains requested or advertised optional capabilities, whereas the supported rates 228 indicate basic and/or supported data rates. The SSID 250 contains a sequence of characters (e.g., 32 characters) that uniquely identifies the wireless network 110 and that may be used to ensure that nodes connect to the proper network when multiple networks operate in a given area.

The embodiments described herein are directed to a technique configured to utilize frames generated by a first layer of a protocol stack for a first network (wireless network) to configure network parameters associated with a second layer of the protocol stack for a second network (e.g., the wired network 130). The first network acts a medium for deploying the cluster to use the second network for data operation, but without relying on the second network for configuring the deployment, i.e., the first network acts as a configuration plane for cluster deployment on the operating (second) network acting as a data plane, e.g., without the second network relying on self-deployment. The frames are illustratively wireless protocol beacon frames 200 (e.g., IEEE 802.11 standard) generated by a data link layer of a Transmission Control Protocol/Internet Protocol (TCP/IP) stack for a wireless network, such as wireless network 100, and the network parameters are illustratively IP addresses associated with a network layer of the TCP/IP stack for a wired network, such as wired computer network 130. Notably, the beacon frames 200 of the wireless network 100 may be utilized for two-way communication exchange on a per node basis for each node in the wired network 130. In this manner, each node and the AP exchange beacon frames as a form of two-way communication using the SSID field of the beacon frame as a communication payload.

According to an aspect of the technique, the beacon frames 200 may be encoded to communicate assigned network configuration parameters to the nodes 400 for use in the wired network 130, which is separate and apart from the wireless network 100. Each node 400 may advertise an identifier (e.g., a serial number of the node) encoded in the SSID 250 of a beacon frame 200 to the AP 110 of the wireless network 100. For more secure communication, the SSID field of the beacon frame may be encrypted. The AP may examine the identifier and, in response, inform the node 400 of its assigned network configuration by returning the beacon frame 200 with configuration parameters (e.g., IP address and VLAN tag) encoded in the SSID 250 of the frame.

In an embodiment, the wired network 130 is not established, i.e., not configured, and a node 400 advertises its SSID 250 (via the beacon frame 200) informing the AP 110 of its serial number and the fact that it is un-configured (has no IP address). The AP 110 may then encode the content of the SSID 250 of a return beacon frame to inform the node 400 of its assigned network configuration parameters (e.g., IP address and VLAN tag). That is, the AP returns a "handshake" frame to the node (identified by serial number) specifying the IP address assigned to the node, along with a VLAN tag. The node may then impose that network configuration upon itself, and transmit a confirmation beacon frame back to the AP 110, wherein the confirmation frame has the SSID encoded with the assigned IP address and VLAN tag. Upon examining the SSID of the received confirmation frame, the AP 110 may confirm (verify) that the node has imposed its IP address to match the specified network configuration; the AP may then proceed to configure a next node in the wired network 130 by encoding the SSID 250 of other return beacon frames 200. As a result, the wireless network 100 is used to initialize the network parameters of the wired network so that the nodes of the cluster are deployed to communicate on the operating network 130.

Notably, the SSID 250 may be encoded for an entirely different purpose than that for which it is intended in a typical wireless network, i.e., a static network identifier. Instead, according to the technique, the SSID encoding is used for a highly dynamic purpose of interactively configuring the nodes of the cluster for operation on the wired network. Moreover, the two-way communication handshake exchange between each node 400 and the AP 110 involves (i) a node 400 broadcasting a beacon frame 200 having the SSID 250 encoded with an identifier (e.g., serial number) of the node; (2) the AP 110 responding with a return beacon frame 200 having the SSID encoded with configuration parameters specifying an IP address and VLAN tag assigned to the node; (3) the node 400 receiving and imposing (i.e., deploying) the configuration parameters upon itself; and (4) the node 400 confirming the imposition of the configuration by transmitting a confirmation beacon frame having the SSID encoded with the assigned IP address and VLAN tag to enable the AP 110 to confirm imposition of the network configuration parameters at the node.

Notably, prior approaches that used SSID encoding to communicate information did so to typically configure a corresponding wireless network and/or interface and not to transmit information regarding other (e.g., wired) network interfaces. As described herein, the technique does not utilize SSID encoding to configure the wireless network 100 (i.e., a network corresponding to wireless interfaces of the nodes communicating with the AP) but as rather as a communication conduit (channel) to configure the wired network 130. That is, the encoded SSID 250 is used to configure the network (wired network 130) for cluster operation by using the beacon frames 200 of a different network (wireless network 100). Note that the configured node may employ the SSID to acknowledge and confirm receipt, and impose the configuration parameters, which are thereafter returned (i.e., "echoed back") to the AP via the SSID 250 of the beacon frame 200.

The AP 110 examines the SSID 250 to verify and record the imposed network configuration in a network configuration database, and proceeds to configuration of a next node of the wired network 130. The use of the encoded SSID beacon frames over the wireless network may be characterized as an out-of-band "configuration management plane" as opposed to the wired network "data plane." Notably, the wireless network 100 is used primarily as a configuration plane for network configuration of the operational data network for the cluster. To avoid potential mischievousness (hacking) activity to the beacon frames, a key exchange mechanism may be used to encrypt the SSID values/content of the beacon frames.

Wired Network

In another aspect of the technique, the encoded beacon frames 200 may then be broadcast over the wired network 130 to advertise the assigned IP addresses of the nodes 400 to an administrative node of the wired network for discovery and verification purposes. In one or more embodiments, the administrative node may incorporate the AP 100, while in other embodiments, the administrative node may be embodied as a node. Each node 400 may be configured with one or more wired network interfaces and a wireless network interface. The SSID of the wireless network interface may be encoded with the assigned IP address of the wired network interface, thereby providing an efficient and convenient way for the administrator to determine (discover) the network configuration parameters assigned to the wired network interface of the node and then, if appropriate, reconfigure the node with changed parameters. That is, the wireless network acts as an initial configuration plane to "jump-start" configuration of wired network for deployment of the cluster by the administrator using the wired (or wireless) network. The wireless network interface may be a Wi-Fi adapter coupled to the node via a Universal Serial Bus (USB) port (Wi-Fi dongle) such that the dongle can be removed from the node by the administrator once the IP address has been determined, i.e., the wired network having a sufficient initial configuration to enable further administration/control via the wired network.

Figure 3:
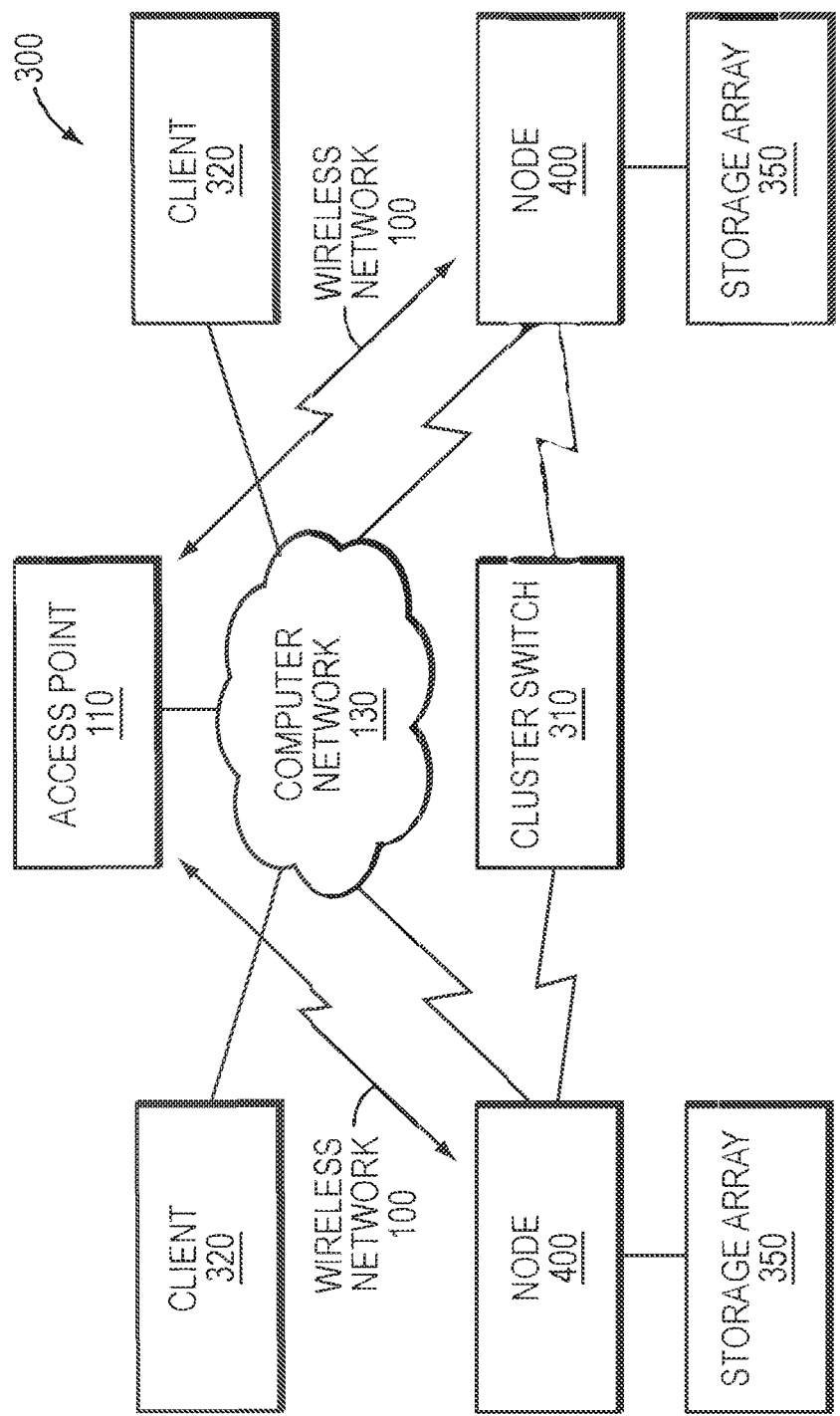
FIG. 3 is a block diagram of the nodes interconnected as a cluster over a wired network.

FIG. 3 is a block diagram of the nodes 400 interconnected as a cluster 300 and configured to provide various services, such compute, storage and management services, for information, i.e., data and metadata, organized and stored on storage devices of the cluster. The nodes 400 may be interconnected by one or more cluster network switches 310 and include functional components that cooperate to provide a distributed, scale-out storage architecture of the cluster 300. The components of each node 400 include hardware and software functionality that enable the node to connect to and service one or more clients 320 over a computer network 130, as well as to a storage array 350 of storage devices, to thereby render the services in accordance with the distributed storage architecture.

Each client 320 may be embodied as a general-purpose computer configured to interact with the node 400 in accordance with a client/server model of information delivery. That is, the client 320 may request the services of the node 400, and the node may return the results of the services requested by the client, by exchanging packets over the network 130. The client may issue packets including file-based access protocols, such as the Network File System (NFS) and Common Internet File System (CIFS) protocols over the TCP/IP, when accessing information on the node in the form of storage objects, such as files and directories. However, in an embodiment, the client 320 illustratively issues packets including block-based access protocols, such as the Small Computer Systems Interface (SCSI) protocol encapsulated over TCP (iSCSI) and SCSI encapsulated over FC (FCP), when accessing information in the form of storage objects such as logical units (LUNs).

Figure 4:
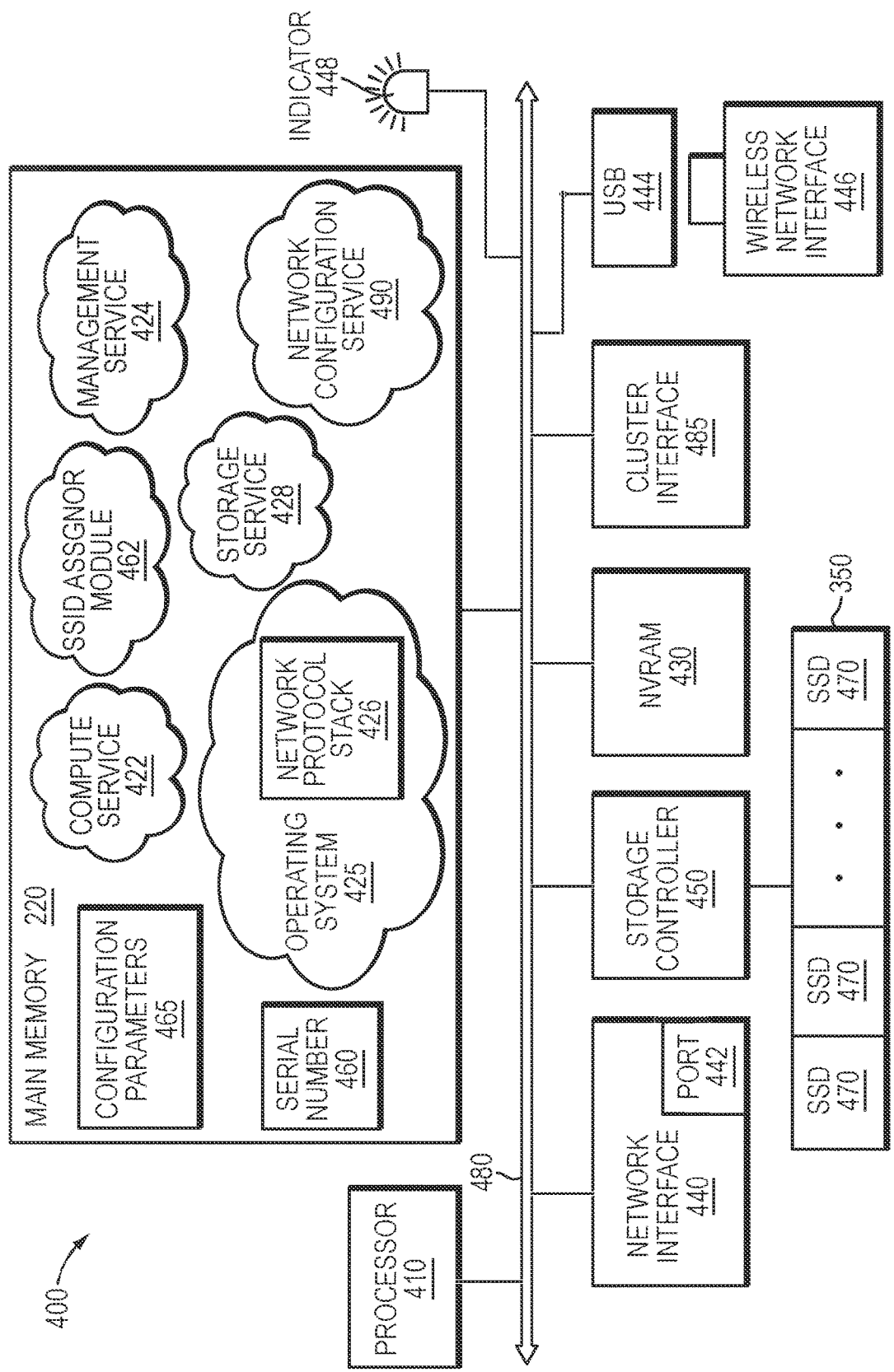
FIG. 4 is a block diagram of a node.

FIG. 4 is a block diagram of a node 400 illustratively embodied as a computer system having one or more processing units (processors) 410, a main memory 420, a non-volatile random access memory (NVRAM) 430, one or more wired network interfaces 440 (having one or more ports 442), a wireless network interface 446 removably coupled via a USB interface 444, one or more storage controllers 450, and one or more cluster interfaces 485 interconnected by a system bus 480. Alternatively, the wireless network interface may be directly coupled to the system bus (i.e., an "on-board" wireless network interface). The wired network interface 440 may include one or more ports adapted to couple the node 400 to the client(s) 320 over computer network 130, which may include point-to-point links, wide area networks, virtual private networks implemented over a public network (Internet) or a shared local area network. The network interface 440 thus includes the mechanical, electrical and signaling circuitry needed to connect the node to the network 130, which may embody an Ethernet network.

The main memory 420 may include memory locations that are addressable by the processor 410 for storing software programs and data structures associated with the embodiments described herein. The processor 410 may, in turn, include processing elements and/or logic circuitry configured to execute the software programs, such as compute service 222, data management service 424, and storage service 426, and manipulate the data structures. An operating system 425, portions of which are typically resident in memory 420 (in-core) and executed by the processing elements (e.g., processor 410), functionally organizes the node by, inter alia, invoking operations in support of the services implemented by the node. A suitable operating system 425 may include a general-purpose operating system, such as the UNIX® series, the Linux® operating system, the FreeBSD® operating system (and the like) or Microsoft Windows® series of operating systems, or an operating system with configurable functionality such as microkernels and embedded kernels. It will be apparent to those skilled in the art that other processing and memory means, including various computer readable media, may be used to store and execute program instructions pertaining to the embodiments herein.

The operating system 425 also includes a network protocol stack 426 for exchanging messages and/or other network traffic over the cluster and computer networks (wireless network 100 and wired network 130). Notably, each node 400 implements a network configuration service 490 for implementing the technique described herein, which utilizes the wireless beacon frames 200 generated by a data link layer of the network protocol (e.g., TCP/IP) stack 426 for the wireless network 100 to configure network parameters (e.g., IP addresses and VLAN tags) associated with a network layer of the TCP/IP protocol stack 426 for the wired network interfaces 440 of each node attached to the wired network 130.

The storage controller 450 cooperates with the services implemented on the node 400 to access information requested by the client 320. The information is preferably stored on storage devices such as solid state drives (SSDs) 470, illustratively embodied as flash storage devices, of storage array 350. In an embodiment, the flash storage devices may be block-oriented devices (i.e., drives accessed as blocks) based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. The storage controller 450 may include one or more ports having I/O interface circuitry that couples to the SSDs 470 over an I/O interconnect arrangement, such as a conventional serial attached SCSI (SAS), serial ATA (SATA) topology, and Peripheral Component Interconnect (PCI) express.

Each cluster interface 485 may include one or more ports adapted to couple the node 400 to the other node(s) of the cluster 300. In an embodiment, a plurality of Ethernet ports (e.g., 10 Gbps) included in the one or more wired network interfaces may be used for internode (or client) communication, although it will be apparent to those skilled in the art that other types of protocols and interconnects may be utilized within the embodiments described herein. The NVRAM 430 may include a back-up battery or other built-in last-state retention capability (e.g., non-volatile semiconductor memory such as storage class memory) that is capable of maintaining data in light of a failure to the node and cluster environment.

The memory 220 may include a serial number 460 associated with the node and an SSID assignor module 462 to encode and assign an SSID for broadcast via the wireless network interface 446. The SSID includes a text size denoting a number of alphanumeric characters that may be encoded in the SSID field (e.g., as specified in the IEEE 802.11 specification). In an embodiment, the serial number 460 is a number that identifies the node vis-à-vis the other nodes of the cluster (i.e., the serial number is unique among the nodes of the cluster). Illustratively, the serial number 460 may correspond to a serial number tag or stamp on the node, or a media access control (MAC) address of a port 442 on the wired network interface 440. Notably, the serial number 460 may be stored in a first read-only memory unit while SSID assignor module 462 may be in a different memory unit such as a boot memory (not shown).

Illustratively, the SSID assignor module 462 can be an application, program, subroutine, function, or other logical unit of executable code (i.e., program instructions) that operates to assign an SSID to the wireless network interface 446 Notably, one or more SSIDs may be assigned to the wireless network interface for various different Wi-Fi radio frequencies (e.g., 2.4 GHz, 5 GHz). Alternatively, a different SSID may be assigned for one or more of the wired network interfaces of the node at a same radio frequency, so that configuration of the node may proceed network interface-by-network interface in parallel.

Prior to cluster deployment (i.e., during cluster startup or initialization) or during reconfiguration, each network interface 440 may be assigned a default IP address (e.g., IPv4 address such as 192.168.9) using the Dynamic Host Configuration Protocol (DHCP), Automatic Private IP Addressing (APIPA), or other network address assignment protocol. Notably, the default IP address may or may not be a desired commissioned IP address to be deployed in the cluster and may not be known to the administrator or to other nodes. Accordingly, each node needs to be identified and configured (i.e., commissioned) for operation on the wired network. However, because self-discovery via the wired network may be difficult, protracted or impossible, the wireless network acting as a configuration plane may be used to discover and configure (and, in some embodiments, verify) the network interfaces (network ports) of the nodes for appropriate deployment. To that end, during startup the SSID assignor module 462 may configure the beacon transmitted from the wireless network adapter to encode the serial number in the SSID. Note that SSIDs are typically limited to a predefined number (e.g., 32 for IEEE 802.11 standard) of characters, which can be used to advertise a variety of information such as serial number, as well as IP address (IPv4, IPv6) and VLAN tag. As such, more information also may be encoded in the remaining text of the SSID, such as the assigned IP address (e.g., the default IP address) and VLAN tag for the one or more wired network adapters as well as other diagnostic information (e.g., product name and model). In this manner, each node and the AP exchange beacon frames as a form of two-way communication using the SSID field of the beacon frame as a communication payload.

The encoded content of the SSID 250 in the beacon frame 200 transmitted by the AP 110 may be highly dynamic in that the content may change as the AP rotates communication among various nodes of the wired network 130. Note that multiple SSIDs may be broadcast simultaneously to support concurrent communication of more than one node with the AP. Initially, the SSID content may be encoded to instruct each node as to the network configuration parameters it should impose and utilize on the wired network. That is, the AP may return network configuration parameters 465 to a node that advertises its serial number (via the SSID 250 of the beacon frame), instructing the node to configure itself according to the parameters, such as IP address and VLAN tag, encoded in the SSID field. Illustratively, the network configuration service may apply (i.e., impose) the network configuration parameters 465. The two-way communication can be effected between each node and the AP and, once initially configured, between those nodes (of the wired network) and the administrative node for discovery and/or reconfiguration purposes. The administrative node (as well as the AP) may create and use a database of serial numbers and assigned network configuration (IP address, VLAN tag) of nodes in the wired network for management configuration purposes.

As persons of skill in the art will recognize, the operations described above may be performed when a system is powered on, rebooted, and in response to the Wi-Fi dongle (i.e., wireless network interface 446) being inserted into the USB port 444. As such, configuration may be trigger to occur for a portion of the cluster as small as a single node or for a portion as large as the whole cluster.

Note that one of the wired network interfaces 440 may be used as a management interface to the node once its IP address is discovered and identity recognized, while one or more other network interfaces may be used for data transfer to and from the node. In some aspects, the SSID assignor module 462 can select one of the multiple wired network interfaces and encode its IP address into the SSID of the wireless network interface 446. Illustratively, the selection is based on the function (i.e., management, data storage operations) of the wired network interface. For example, the SSID assignor module 462 may select the management wired network interface and encode its assigned IP address. Alternatively, the selection can be based on an order that the wired network interfaces are presented on the node. In alternative aspects, the SSID assignor module 462 can encode multiple IP addresses into the SSID of the wireless network interface.

The wired network interfaces 440 and wireless network interface 446 may be configured to operate differently with respect to data communication to and from the node so that communication is isolated between the networks. Illustratively, the wired network interfaces 440 may be configured to accept connections from other network devices (e.g., clients and other nodes) and allow data transfer to and from the node itself. In contrast, wireless network interface 446 may be configured such that network connections are not accepted and data transfer to and from the node 400 is restricted (e.g., prohibited) via wireless network interface 446. That is, the wireless network interface may be configured to employ a link layer of a network protocol stack (i.e., broadcast the SSID in a beacon frame), but may prevent communication using any higher layer of the network protocol stack (i.e., network software infrastructure) that would provide general data communications capability, e.g., via TCP/IP, via the wireless network interface 446. In this manner, security vulnerability of the nodes may be contained as the wireless network 100 on the nodes is configured to prevent TCP/IP layer communication and is restricted to link layer communication, e.g., based on SSID beacon communication. Further, communication via the link layer of the wireless network is confined to being used for configuration of the wired network and related diagnostic information. Notably the information encoded in the SSID 250 may be broadcast to the administrative node for configuration verification, discovery and/or reconfiguration purposes. As such, the information broadcast in the SSID provides an efficient and convenient way for the administrator to determine, verify and possibly change the network configuration parameters 465 assigned to the wired network interface 440 of the node. As noted, the wireless network interface 446 may be a Wi-Fi adapter coupled to the node via a USB port (Wi-Fi dongle) such that the Wi-Fi dongle can be removed from the node by the administrator once the IP address has been determined.

Diagnostic Locator

In another aspect of the technique, the information of the encoded beacon frames may be used for diagnostic location of a node in the cluster. In response to a failure or error related to a wired network interface 440 of a node (e.g., no IP address assigned), a visual indicator 448 (e.g., a light) may be programmed according to a particular visual pattern (e.g., three long blinks followed by two short blinks) for diagnostic purposes, so that the node 400 can be located. Accordingly, the SSID 250 may be programmed with an error code associated with the failure and a corresponding pattern (e.g., "3L2S" for 3 long, 2 short). In this manner, a particular node with a reported error may be specifically identified and located. Note that each node 400 having an error may employ a different pattern, so that multiple nodes may be located at the same time. In some aspects, the SSID 250 may start with a preamble. For example, the preamble can be an identifier of the maker or product name of the node. Thus, the SSID can be the preamble followed by the IP address in text form. For instance, assume that the maker of the node is "NetApp", that the product is a hyper converged infrastructure (HCI) product, and that the IP address is 192.168.1.9. The SSID may be encoded as "NetApp HCI 192.168.1.9."

Figure 5:
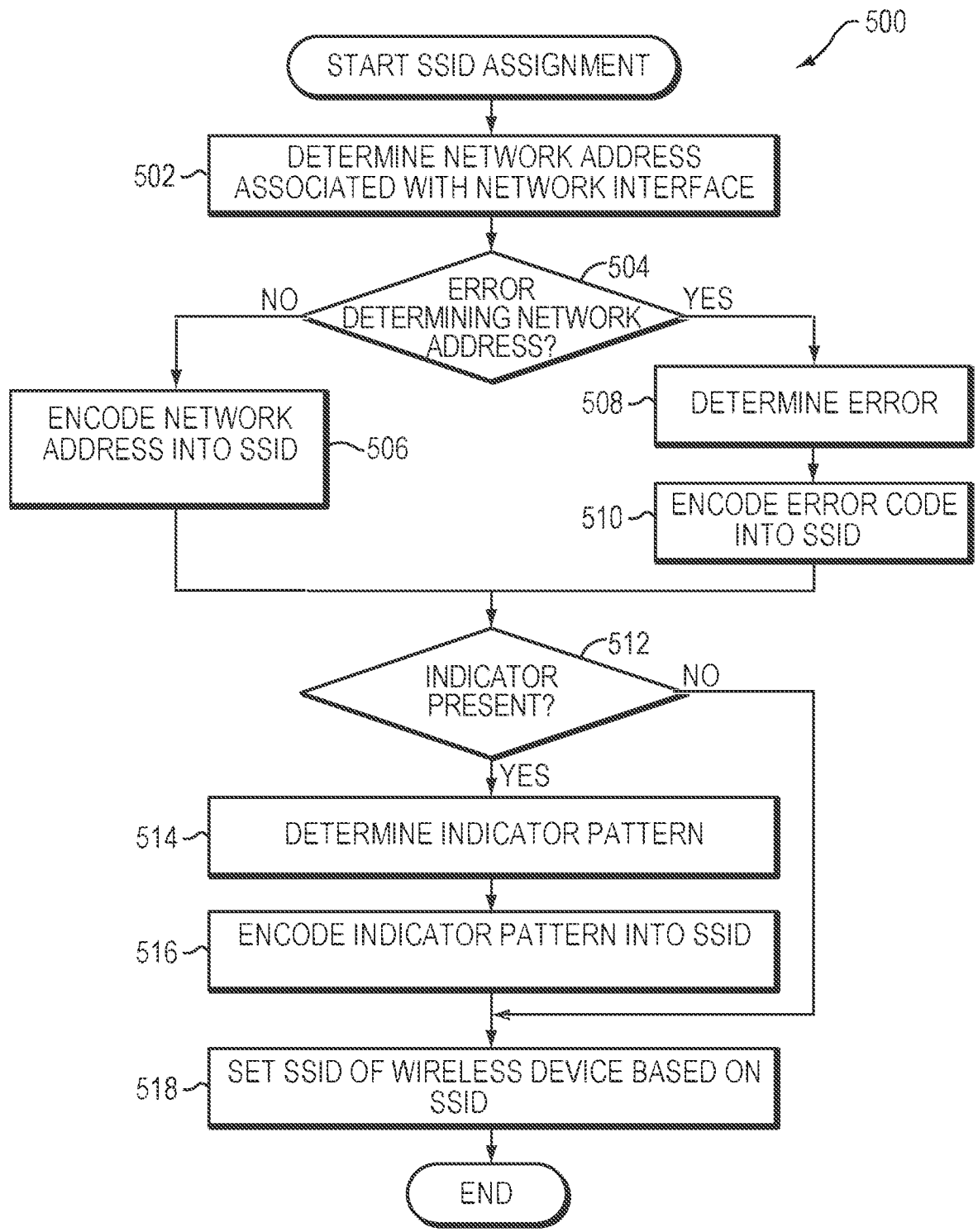
FIG. 5 is a flow chart illustrating example operations for setting a SSID of the beacon frame.

FIG. 5 is a flow chart 500 illustrating example operations (e.g., diagnostic location) for setting the SSID of the beacon frame for the wireless network interface based on a network address of a network interface different from the wireless network interface, e.g., one or more of the wired network interfaces. These operations may be performed when a node is powered on or rebooted, when a wireless network interface dongle is inserted into a USB port, or at other points in time as may be considered desirable.

At block 502, the SSID assignor module attempts to determine a network address associated with a network interface. For example, the SSID assignor attempts to determine the IP address of one or more of the wired network interfaces present on the node. At decision block 504, the SSID assignor module checks if the attempt to determine (and obtain) the IP address of the wired network interface succeeded. If the SSID assignor module is able to obtain the IP address of the wired network interface, then flow proceeds to block 506. If the SSID assignor module was not able to obtain the IP address of the wired network interface, flow proceeds to block 508.

At block 506, the SSID assignor module encodes the IP address of the wired network interface into the SSID. As noted above, the IP address can be encoded into a portion or all of the text of the SSID. As indicated above, the SSID may start with an identifier of the maker of the node, followed by the IP address in text from. For example, assume that the maker of the node is "NetApp", and that the IP address is 192.168.1.9. The SSID can be encoded as "NetApp 192.168.1.9." Flow then proceeds to block 512.

Block 508 is reached if there was an error in obtaining the IP address of the wired network interface. At block 508, the SSID assignor attempts to determine the error. For example, the SSID assignor may receive an error code or other indicator that an IP address has not been assigned to the wired network interface. At block 510, the SSID assignor may encode the error code into some or all of the SSID. As an example, the SSID could be set to "IP Address Unavailable." As noted above, the SSID can include an identifier of the maker of the node, for example, NetApp. Thus, an example SSID text string could be "NetApp—IP Address Unavailable." Flow then proceeds to decision block 512. Decision block 512 is reached from block 506 where the SSID has been set to the IP address of the wired network interface or from block 510 where the SSID has been set to indicate an error code or error message. At block 512, a check is made to determine if the indicator 448 is present on the node. If an indicator is not present, flow proceeds to block 518.

At block 514, the SSID assignor module determines a pattern for the indicator. For example, if the indicator 448 is a light (e.g., LED or other type of light) that can be programmatically turned on and off, the SSID assignor module 462 can determine a pattern for the on and off cycles. Note that different nodes may employ different indicator patterns, so that multiple nodes may be located at the same time.

At block 516, the pattern for the indicator can be encoded into the SSID. For example, if the indicator 448 is made to blink with three long blinks followed by two short blinks, the text "---.." or "3L2S" (three long, two short) could be encoded into the SSID 250. Alternatively, the length of the period may be encoded into the SSID. For example, "5 SEC ON, 2 SEC OFF" could be encoded into the SSID to represent that the indicator would be turned on for five seconds and off for two seconds. In this way, the administrator can match the IP address or error message text to a particular location in a rack within a data center. Continuing with the example above where the IP address of the wired network interface is 192.16.1.9, the SSID may be "NetApp HC1 192.168.1.9---.."

At block 518, the SSID assignor module can set the SSID for a wireless network interface on the computing device to be the SSID. The wireless network interface can then wirelessly transmit the SSID in beacon frames.

As will be appreciated from the above, the aspects of the disclosure provide an efficient and convenient way for a system administrator to determine IP addresses of newly installed nodes in the cluster, a data center or other collection of computing devices. In an embodiment a smart phone, table computer, laptop computer or other portable computing device having a wireless network interface may be used to scan for SSIDs being broadcast by the newly installed computing devices. A specialized application on the smart phone or other portable computing device may be used to scan the SSIDs, decode, report and/or interpret information in the SSID, such as the diagnostic information (e.g., "3L2S") and store the IP addresses encoded therein. Once the IP addresses have been recorded, the wireless network interface dongle may be removed from the computing device.

Advantageously, the encoded content of the SSID in the beacon frame transmitted by the AP 110 may be highly dynamic in that the content may change as the AP rotates communication among various nodes 400 of the wired network 130. Initially, the SSID content may be encoded to instruct each node as to the network configuration parameters 465 it should impose and utilize on the wired network. That is, the AP may return network configuration parameters to a node that advertises its serial number (via the SSID of the beacon frame), instructing the node to configure itself according to the parameters, such as IP address and VLAN tag, encoded in the SSID field. Note that SSIDs are limited to a predefined number (e.g., 32) of characters, which can be used to advertise information such as serial number, as well as IP address (IPv4, IPv6) and VLAN tag. The two-way communication can be effected between each node and the AP and, once initially configured, between those nodes (of the wired network) and the administrative node for discovery and/or reconfiguration purposes. The administrative node (as well as the AP) may then create a database of serial numbers and assigned network configuration (IP address, VLAN tag) of nodes in the wired network for management configuration purposes.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus representing a storage node or a compute node of a plurality of nodes to be configured as part of a cluster, the apparatus comprising:
   a processor;
   a wired network interface coupled to the processor and operable to make use of a wired network as a data plane for the cluster;
   a wireless network interface coupled to the processor, the wireless network interface operable to transmit and receive wireless protocol messages via a wireless network serving as a configuration plane for the cluster; and a memory coupled to the processor, the memory including program instructions, which when executed by the processor cause the apparatus to:

send an out-of-band configuration request, requesting configuration information for the wired network interface, by broadcasting a first wireless protocol message within the wireless network via the wireless network interface; and responsive to successfully obtaining the configuration information through a second wireless protocol message received via the wireless network interface in response to the out-of-band configuration request, apply the configuration information to configure the wired network interface.

2. The apparatus of claim 1, wherein execution of the program instructions further cause the processor to responsive to a failure to obtain the configuration information, facilitate location of the apparatus within a data center by causing a visual indicator of the apparatus to operate in accordance with a particular visual pattern.

3. The apparatus of claim 2, wherein execution of the program instructions further cause the processor to:

encode diagnostic information, including information regarding the particular visual pattern, within a third wireless protocol message; and send the third wireless protocol message via the wireless network interface.

4. The apparatus of claim 1, wherein the first wireless protocol message comprises a first beacon and the second wireless protocol message comprise a second beacon.

5. The apparatus of claim 4, wherein the identifier comprises a media access control (MAC) address of the wired network interface or a serial number of the apparatus and is encoded in a first service set identifier (SSID) field included in the first beacon and the configuration information is included in a second SSID field included in the second beacon.

6. The apparatus of claim 4, wherein the first beacon and the second beacon operate at a link layer of a protocol stack and the configuration information is applied to configure the wired network interface at a transport layer of the protocol stack.

7. The apparatus of claim 1, wherein the configuration information includes one or more of an Internet Protocol (IP) address and a virtual local area network (VLAN) tag assigned to the wired network interface responsive to the out-of-band configuration request.

8. A method for commissioning a node of a plurality of nodes of a cluster comprising:

determining an identifier of the node having a wired network interface, wherein the identifier uniquely identifies the node within the cluster and wherein the wired network interface is operable to make use of a wired network as a data plane for the cluster;

encoding the identifier for transmission in a first wireless protocol message via wireless communication;

sending an out-of-band configuration request, requesting configuration information for the wired network interface by broadcasting the first wireless protocol message within a wireless network serving as a configuration plane for the cluster via a wireless network interface associated with the node;

responsive to successfully obtaining the configuration information through a second wireless protocol message received via the wireless network interface in response to the out-of-band configuration request, applying the configuration information to configure the wired network interface; and responsive to a failure to obtain the configuration information, facilitating location of the node within a data center by causing a visual indicator of the node to operate in accordance with a particular visual pattern.

9. The method of claim 8, further comprising:

encoding diagnostic information, including information regarding the particular visual pattern within a third wireless protocol message; and sending the third wireless protocol message via the wireless network interface.

10. The method of claim 8, wherein the first wireless protocol message comprises a first beacon and the second wireless protocol message comprise a second beacon.

11. The method of claim 10, wherein the identifier comprises a media access control (MAC) address of the wired network interface or a serial number of the node and is encoded in a first service set identifier (SSID) field within the first beacon and the configuration information is included in a second SSID field within the second beacon.

12. The method of claim 10, wherein the first beacon and the second beacon operate at a link layer of a protocol stack and the configuration information is applied to configure the wired network interface at a transport layer of the protocol stack.

13. The method of claim 8, wherein the configuration information includes one or more of an Internet Protocol (IP) address and a virtual local area network (VLAN) tag assigned to the first network interface responsive to the out-of-band configuration request.

14. A non-transitory computer readable medium having program instructions, which, when executed by a processor of a node of a plurality of nodes to be configured as part of a cluster, cause the node to:

send an out-of-band configuration request, requesting configuration information for a wired network interface of the node, by broadcasting a first wireless protocol message within a wireless network via a wireless network interface of the node, wherein the cluster makes use of the wired network as a data plane for the cluster, and wherein the cluster makes use of the wireless network as a configuration plane for the cluster; and responsive to successfully obtaining the configuration information through a second wireless protocol message received via the wireless network interface in response to the out-of-band configuration request, apply the configuration information to configure the wired network interface.

15. The non-transitory computer readable medium of claim 14, wherein execution of the program instructions further cause the processor to responsive to a failure to obtain the configuration information, facilitate location of the node within a data center by causing a visual indicator of the node to operate in accordance with a particular visual pattern.

16. The non-transitory computer readable medium of claim 15, wherein execution of the program instructions further cause the processor to:

encode diagnostic information, including information regarding the particular visual pattern, within a third wireless protocol message; and send the third wireless protocol message via the wireless network interface.

17. The non-transitory computer readable medium of claim 14, wherein the first wireless protocol message comprises a first beacon and the second wireless protocol message comprise a second beacon.

18. The non-transitory computer readable medium of claim 17, wherein the identifier comprises a media access control (MAC) address of the wired network interface or a serial number of the apparatus and is encoded in a first service set identifier (SSID) field included in the first beacon and the configuration information is included in a second SSID field included in the second beacon.

19. The non-transitory computer readable medium of claim 17, wherein the first beacon and the second beacon operate at a link layer of a protocol stack and the configuration information is applied to configure the wired network interface at a transport layer of the protocol stack.

20. The non-transitory computer readable medium of claim 14, wherein the configuration information includes one or more of an Internet Protocol (IP) address and a virtual local area network (VLAN) tag assigned to the wired network interface responsive to the out-of-band configuration request.

* * * * *